US011175907B2

(12) United States Patent
Marsnik et al.

(10) Patent No.: US 11,175,907 B2
(45) Date of Patent: Nov. 16, 2021

(54) INTELLIGENT APPLICATION MANAGEMENT AND DECOMMISSIONING IN A COMPUTING ENVIRONMENT

(71) Applicant: INTERNATIONAL BUSINESS MACHINES CORPORATION, Armonk, NY (US)

(72) Inventors: Jamie Marsnik, Annandale, MN (US); Holger Drust, Hamburg (DE); Thomas Uhlisch, Sarstedt (DE); Craig Trim, Ventura, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 129 days.

(21) Appl. No.: 16/516,075

(22) Filed: Jul. 18, 2019

(65) Prior Publication Data
US 2021/0019141 A1    Jan. 21, 2021

(51) Int. Cl.
| | |
|---|---|
| *G06F 9/445* | (2018.01) |
| *G06F 8/70* | (2018.01) |
| *G06N 7/00* | (2006.01) |
| *G06F 8/61* | (2018.01) |
| *G06F 16/903* | (2019.01) |
| *G06N 20/00* | (2019.01) |
| *G06F 16/906* | (2019.01) |

(52) U.S. Cl.
CPC ............... *G06F 8/70* (2013.01); *G06F 8/62* (2013.01); *G06F 16/906* (2019.01); *G06F 16/90335* (2019.01); *G06N 7/005* (2013.01); *G06N 20/00* (2019.01)

(58) Field of Classification Search
CPC ...... G06F 8/70; G06F 16/90; G06F 16/90335; G06F 8/62; G06N 20/00; G06N 7/005
USPC .................................................. 717/168–178
See application file for complete search history.

(56) References Cited

U.S. PATENT DOCUMENTS

| | | | |
|---|---|---|---|
| 10,318,882 B2* | 6/2019 | Brueckner | .............. H04L 67/10 |
| 10,817,568 B2* | 10/2020 | Alzate Perez | .... G06F 16/90332 |
| 2004/0260589 A1 | 12/2004 | Varadarajan et al. | |
| 2005/0049973 A1 | 3/2005 | Read et al. | |
| 2007/0067260 A1 | 3/2007 | Marsnik et al. | |
| 2007/0198423 A1 | 8/2007 | Carbone et al. | |
| 2012/0246721 A1 | 9/2012 | Viljoen | |
| 2012/0324434 A1* | 12/2012 | Tewari | ...................... G06F 8/60 |
| | | | 717/168 |
| 2013/0326469 A1 | 12/2013 | Fox et al. | |
| 2016/0004523 A1 | 1/2016 | Boudreau et al. | |
| 2016/0269429 A1 | 9/2016 | Martini et al. | |

* cited by examiner

*Primary Examiner* — Chuck O Kendall
(74) *Attorney, Agent, or Firm* — Griffiths & Seaton PLLC

(57) ABSTRACT

Various embodiments are provided for providing intelligent application management by a processor. One or more data sources associated with each of a plurality of applications may be identified in a computing system. Each of the plurality of applications may be ranked according to a degree of importance, a degree of correlation, or a combination thereof in relation to the one or more data sources. Each of the plurality of applications may be retained or removed according to the ranking.

20 Claims, 7 Drawing Sheets

Query: Can we decommission Db2 Enterprise server edition on Hostname ABC1234 for account ACME?

Key search Terms (with aliases):
DB2 Enterprise Server Edition, ACME

| DOCUMENT TYPE | DOCUMENT TYPE IMPORTANCE | CURRENCY IMPORTANCE | HOSTNAME REQUIRED IN SEARCH |
|---|---|---|---|
| PROBLEM TICKET | 1 | 1 | YES |
| DISASTER RECOVERY | 4 | 5 | NO |
| PATCH MANAGEMENT | 5 | 4 | YES |
| REQUEST FOR SERVICE | 2 | 2 | YES |
| PROJECT PLAN | 3 | 3 | NO |

| AUTHOR TITLE TYPE | AUTHOR IMPORTANCE |
|---|---|
| CLIENT | 1 |
| ARCHITECT | 2 |
| TECHNICAL SME | 3 |
| ANALYST | 4 |
| OTHER | 5 |

| CUR TYPE | AUTHOR IMPORTANCE |
|---|---|
| CLIENT | 1 |
| ARCHITECT | 2 |
| TECHNICAL SME | 3 |
| ANALYST | 4 |
| OTHER | 5 |

FIG. 5B

INTELLIGENT APPLICATION MANAGEMENT AND DECOMMISSIONING IN A COMPUTING ENVIRONMENT

BACKGROUND OF THE INVENTION

Field of the Invention

The present invention relates in general to computing systems, and more particularly to, various embodiments for intelligent application management in a computing system using a computing processor.

Description of the Related Art

In today's society, computer systems are commonplace. Computer systems may be found in the workplace, at home, or at school. Computer systems may include data storage systems, or disk storage systems, to process and store data. In recent years, both software and hardware technologies have experienced amazing advancement. With the new technology, more and more functions are added and greater convenience is provided for use with these electronic appliances. The amount of information to be processed nowadays increases greatly. Therefore, processing, storing, and retrieving very large amounts of information is a key problem to solve.

SUMMARY OF THE INVENTION

Various embodiments are provided for providing intelligent application management in a computing environment by a processor are provided. In one embodiment, by way of example only, a method for providing intelligent application management such as, for example, for ranking and decommissioning software application, again by a processor, is provided. One or more data sources associated with each of a plurality of applications may be identified in a computing system. Each of the plurality of applications may be ranked according to a degree of importance, a degree of correlation, or a combination thereof in relation to the one or more data sources. Each of the plurality of applications may be retained or removed according to the ranking.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 5A-5B is an additional block diagram depicting operations for intelligent application management and decommissioning in which aspects of the present invention may be realized.

DETAILED DESCRIPTION OF THE DRAWINGS

Figure 1:
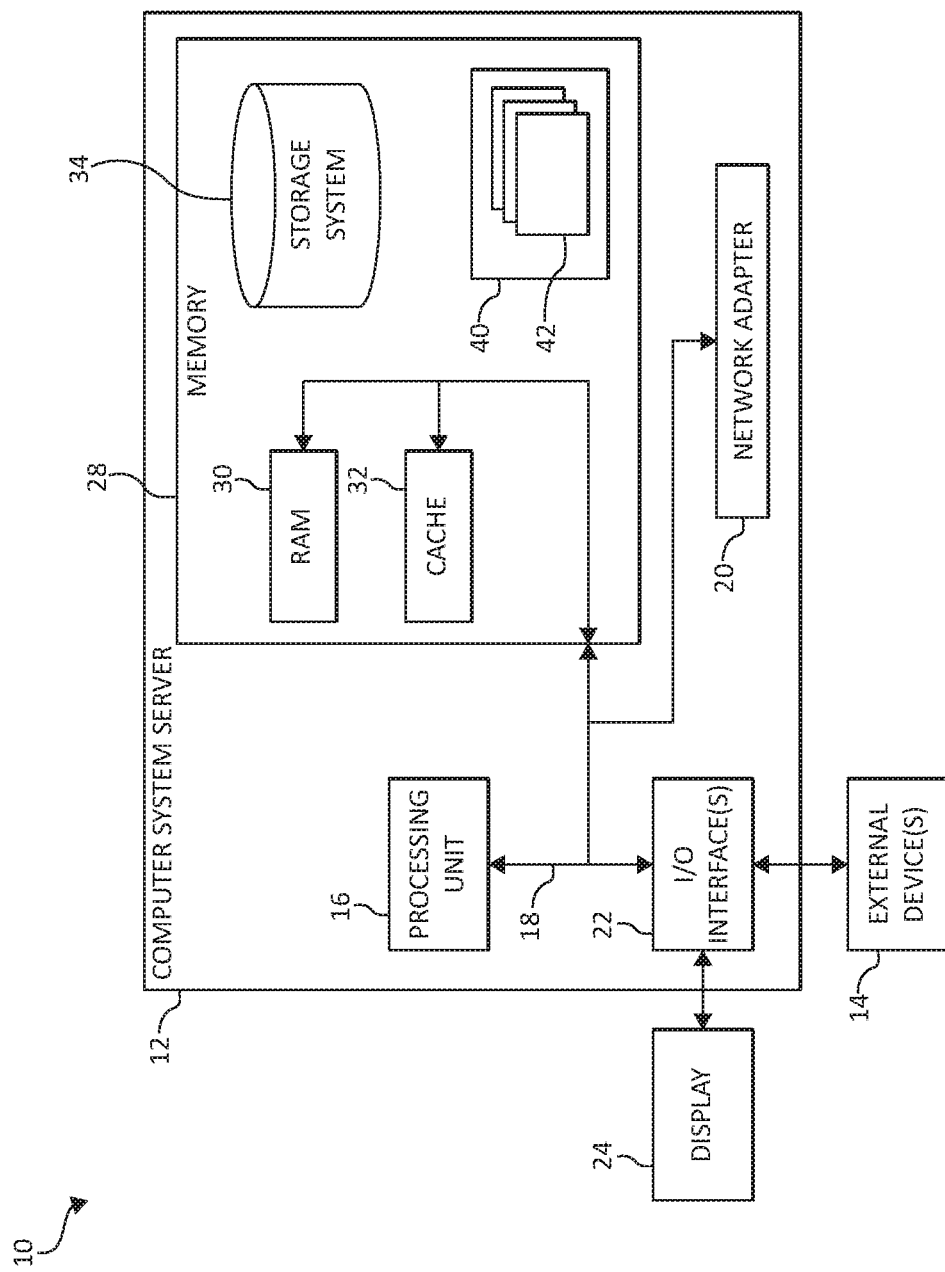
FIG. 1 is a block diagram depicting an exemplary cloud computing node according to an embodiment of the present invention.

Computer programs such as applications, middleware and operating systems are well known today. There are a wide variety of known applications such as database applications, web applications, business function applications, etc. Computer software can be stored and distributed in many forms. Computer software can be made up of many individual software components, such as files or executable programs, which are typically encapsulated in an executable installation package for ease of distribution. The installation package will typically include an executable program to remove, or uninstall, the computer software. Computer software is also frequently modified and updated.

Software deployment is the process of making computer software available for use on a computer system. Conventional software deployment involves copying an installation package to the local storage of a computer system and executing the installation package to place the individual software components on the system. In a network environment, where computer software must be deployed to multiple computer systems, this process is typically automated. Furthermore, in network environments, the installation package is typically executed remotely on a networked storage device and only the individual software components from within the installation package are copied to the multiple computer systems.

Software asset management typically refers to the tracking and management of computer software installed on a computer system for the purposes of keeping the computer software up to date, identifying conflicts, managing software licenses, and tracking software usage. Software asset management solutions are typically employed in large organizations where numerous packages of computer software are deployed to a multitude of computer systems in a networked environment.

A signature file is often used to detect software installed on a computer system. Quite frequently, this signature file is just a text file that is dropped down on to (e.g., installed on) the computer system during installation to identify the software. Unfortunately, these signature files are often dropped down in error. Additionally, these signature files, even when dropped correctly, are not removed when a software decommissioning process for a desired software application is complete. A software scan will then report the software as installed. In reality, the software may not be on the system at all, and only the signature file is resident. As such, identifying software decommission candidates (potentially uninstalled and unused software application/components) becomes extremely difficult and challenging and may result in unintended/unnecessary payment of software license royalties to external vendors on unnecessary licensing related to these uninstalled/unused software components.

Accordingly, the present invention provides a novel solution for providing intelligent application management such as, for example, for ranking and decommissioning software applications. One or more data sources associated with each of a plurality of applications may be identified in a computing system. Each of the plurality of applications may be ranked according to a degree of importance, a degree of correlation, or a combination thereof in relation to the one or more data sources. Each of the plurality of applications may be retained or decommissioned/removed according to the ranking.

The present invention enables the use of natural language processing (NLP) and artificial intelligence (AI) APIs and other machine learning tools for intelligent application management. In one example, an instance of IBM® Watson® NLP may be used (IBM® and Watson® are trademarks of International Business Machines Corporation). An instance of IBM® Watson® API may also be provided. The aspects of IBM® Watson® that the described method and system makes use of are the technologies behind IBM® Watson® Natural Language Understanding. However, other NLP technologies or services may be used to provide the extracted metadata as described herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
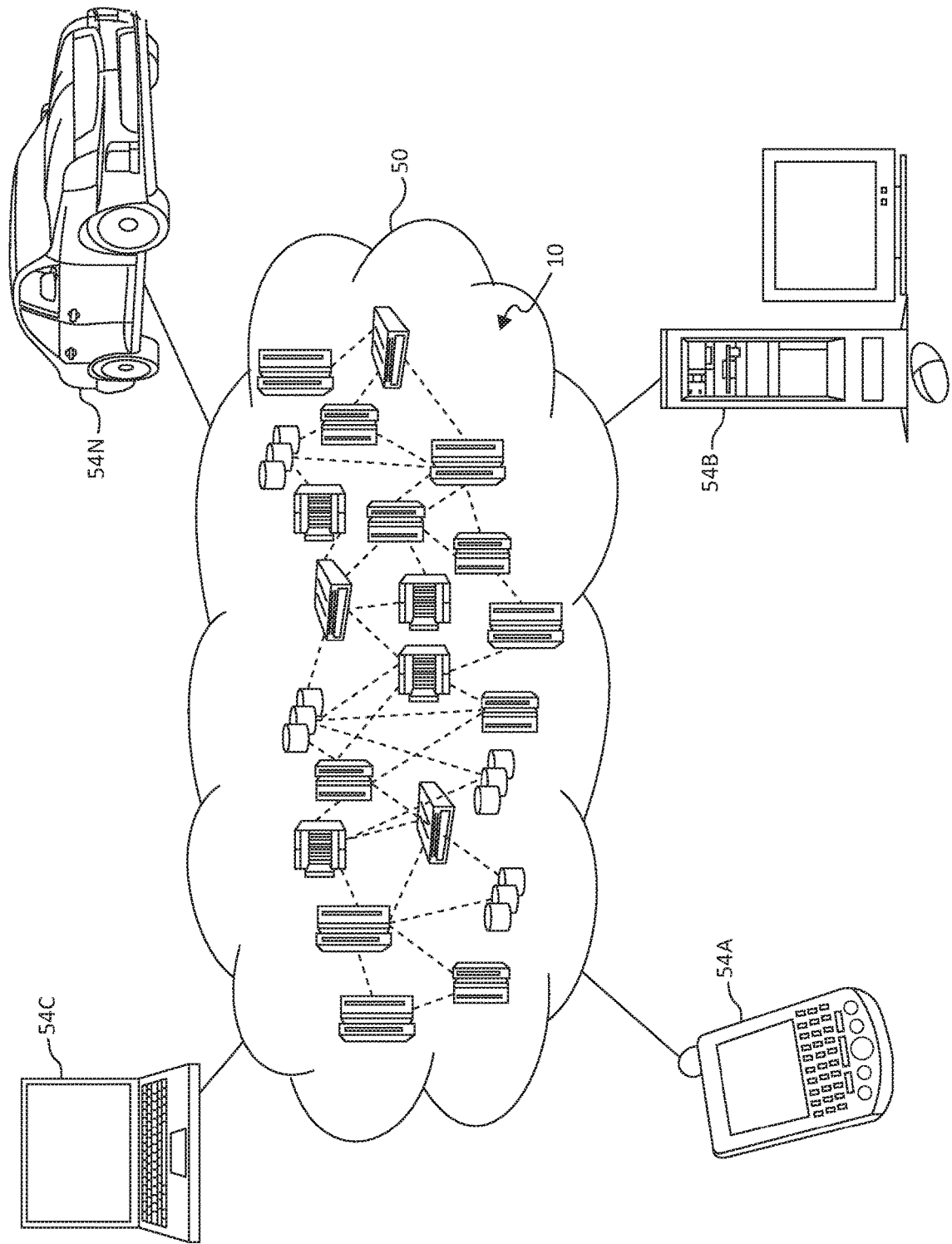
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
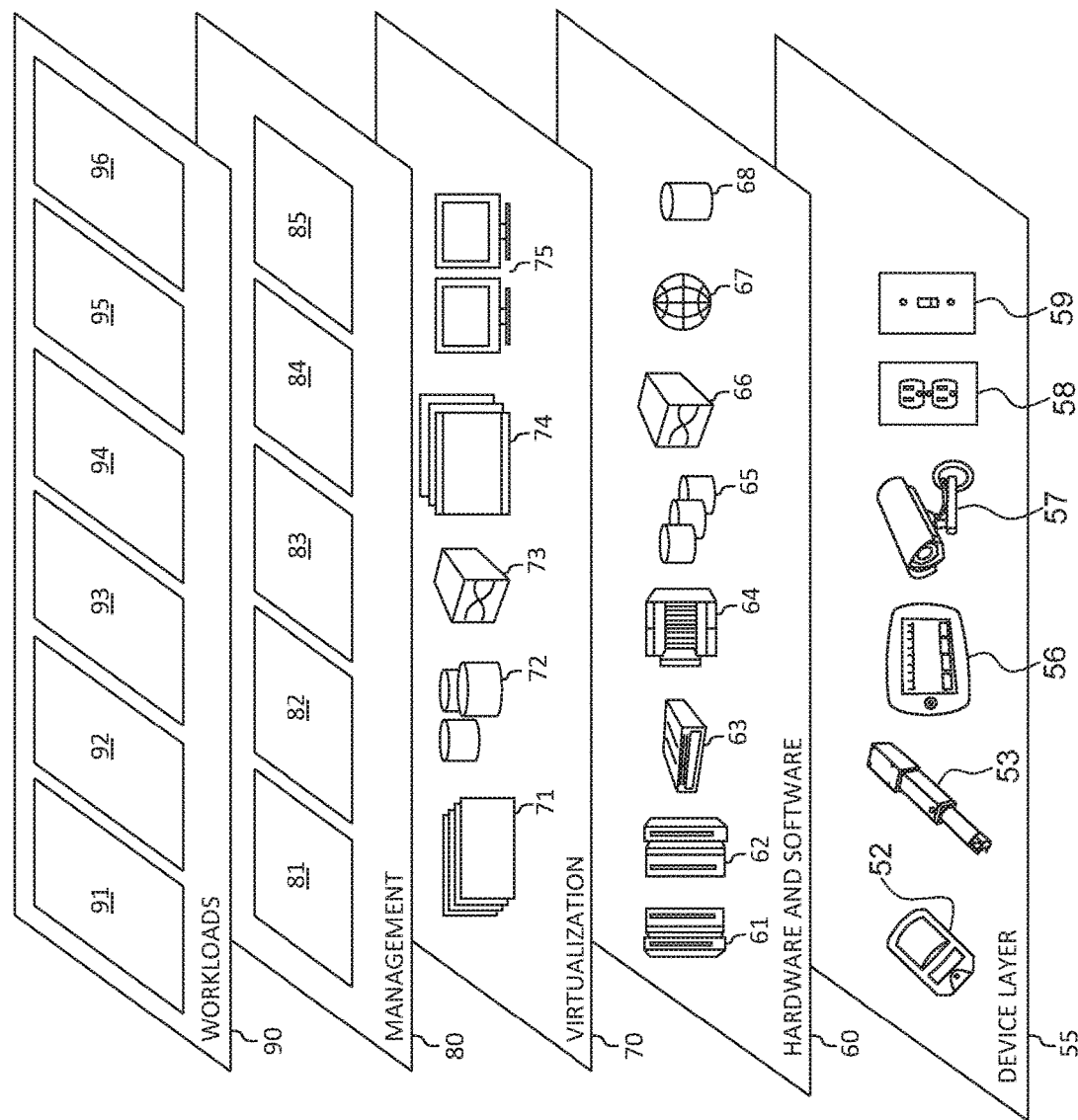
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various intelligent application management workloads and functions 96. In addition, intelligent application management workloads and functions 96 may include such operations as data analysis, analytics operations, and/or machine learning. One of ordinary skill in the art will appreciate that the intelligent application management workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
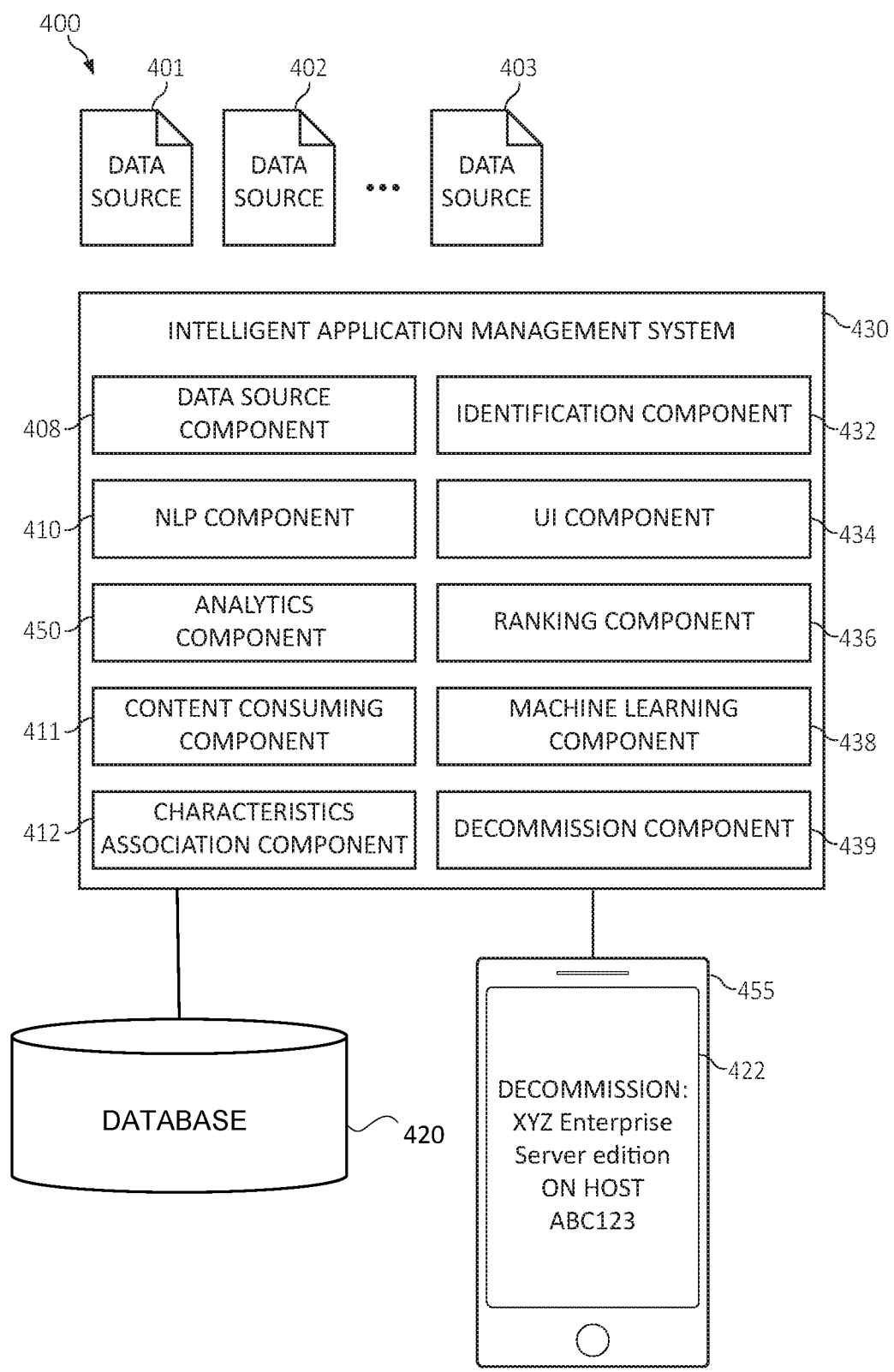
FIG. 4 is an additional block diagram depicting various user hardware and cloud computing components for an intelligent application management system in accordance with aspects of the present invention.

Turning now to FIG. 4, a block diagram of exemplary functionality 400 relating to intelligent application management is depicted. As shown, the various blocks of functionality are depicted with arrows designating the blocks' 400 relationships with each other and to show process flow. Additionally, descriptive information is also seen relating each of the functional blocks 400. As will be seen, many of the functional blocks may also be considered "modules" of functionality, in the same descriptive sense as has been previously described in FIGS. 1-3. With the foregoing in mind, the module blocks 400 may also be incorporated into various hardware and software components of a system for intelligent application management in accordance with the present invention, such as those described in FIGS. 1-3. Many of the functional blocks 400 may execute as background processes on various components, either in distributed computing components, or on the user device, or elsewhere.

Multiple data sources 401-403 may be provided by one or more computing systems (e.g., servers, databases, storage systems, hardware systems, cloud computing systems, other software applications/components, network systems, etc.). The data sources 401-403 may be provide various files, records, software components, contextual data/information, tables, applications, or other elements/items associated with a software application/program. The group of data sources 401-403 are consumed such as, for example, using natural language processing (NLP) and artificial intelligence (AI) to provide processed content.

The data sources 401-403 may be analyzed by an NLP component 410 to data mine or transcribe relevant information from the content of the data sources 401-403 (e.g., files, records, tables, documents, emails, reports, notes, audio records, video recordings, live-streaming communications, etc.) in order to display the information in a more usable manner and/or provide the information in a more searchable manner. The NLP component 410 may be provided as a cloud service or as a local service.

The intelligent application management system 430 may include the NLP component 410, a content consuming component 411, a characteristic association component 412, and a post-processing analytics component 450. The NLP component 410 may be associated with the content consuming component 411. The content consuming component 411 may be used for inputting, receiving, searching, or collecting various data from the data sources 401-403 and running NLP and AI tools against them, learning the content, such as by using the machine learning component 438. It should be noted that other components of FIG. 4 may also employ one or more NLP systems and the NLP component 410 is merely illustrated by way of example only of use of an NLP system. As the NLP component 410 (including the machine learning component 438) learns different data and/or sets of data, the characteristics association component 412 (or "intelligent characteristics association component") may use the artificial intelligence to make associations or links between various data or other software components of the data sources 401-403 by determining common concepts, methods, features, systems, licenses, similar characteristics, and/or an underlying common topic.

As used herein "intelligent" (e.g., cognition or "AI") is the mental process of knowing, including aspects such as awareness, perception, reasoning and judgment. An AI system uses artificial reasoning to interpret the data sources 401-403 and extract their topics, ideas, or concepts. The learned software, software components, software applications, tables, records, files, concepts, suggestions, topics and sub-topics of a domain of interest, may not be specifically named or mentioned in the data sources 401-403 and is derived or inferred by the AI interpretation.

The learned content of the data sources consumed by the NLP system may be merged into a database 420 (and/or knowledge store) or other data storage method of the consumed content with learned concepts, methods, and/or features of the data sources 401-403 providing association between the content referenced to the original data sources 401-403.

The database 420 may maintain a timestamped record of all interactions and contributions of each software component, software license, software signature file, contextual information, software content contributor/administrator, criteria, subject, topic, or idea. The database 420 may record and maintain the evolution of software components, changes, adjustments, software licenses, software signature files, contextual information, software content contributors/administrators, criteria, subject, topic, or idea indicated, analyzed, identified, tagged, or discussed in the data sources 401-403.

The database 420 may track, identify, and associate all activity, events, changes, software updates, software decommissions, software component, software license, software signature file(s), contextual information, software content contributor/administrator, criteria, subject, topic, or idea and the like of all data generated during all stages of the development, retention, or decommission or "life cycle" of the decisions, decision elements, alternatives, choices, criteria, subjects, topics, or ideas. The merging of the data into one database 420 (which may include a domain knowledge) allows the intelligent application management system 430 to act like a search engine, but instead of keyword searches, it will use an AI method of making intellectual associations between the data sources using the deduced concepts.

The intelligent application management system 430 may include a user interface ("UP") component 434 (e.g., an interactive graphical user interface "GUI") providing user interaction with the indexed content for mining and navigation and/or receiving one or more inputs/queries from a user. More specifically, the user interface component 434 may be in communication with a wireless communication device 455 (see also the PDA or cellular telephone 54A, the desktop computer 54B, the laptop computer 54C, and/or the automobile computer system 54N of FIG. 2.) for also providing user input for inputting data such as, for example, queries to issue to data sources 401-403. The wireless communication device 455 may use the UI component 434 (e.g., GUI) for providing input of data and/or providing a query functionality such as, for example, interactive GUI functionality for enabling a user to enter a query in the GUI 422 relating to a software application, software retentions/decommissions, software components, software license, software signature files, contextual information (e.g., data linking software applications and associated files, records, information) software content contributor/administrator data, feedback data, criteria, domain of interest, topic, and/or an associated objective. For example, GUI 422 may display a query relating to whether or not a selected application may be decommissioned with one or more associated query results/answers.

The intelligent application management system 430 may also include an identification component 432. The identification component 432 may be used to identify one or more data sources 401-403 associated with each of a plurality of applications in one or more internal and/or external computing systems. The identification component 432 may be used to define that one or more data sources (e.g., data sources 401-403) include structured data, semi-structured data, and non-structured data in the computing system and that the one or more data sources (e.g., data sources 401-403) is associated with one or more of the plurality of applications.

In one aspect, once the NLP component 410 has carried out, the identification component 432, in association with the NLP component 410, may link software components, software applications, contextual information, and other data, records, files, and information and may mine the data sources 401-403 and/or the database 420 of the consumed content to assist the ranking component to rank each of the software applications.

The ranking component 436 may rank each of the plurality of applications according to a degree of importance, a degree of correlation, or a combination thereof in relation to the one or more data sources 401-403. Thus, the NLP component 410 may perform NLP operation on the one or more data sources 401-403 for determining a degree of importance and a degree of correlation. The machine learning component 438, in association with the identification component 432 and/or the ranking component 436, learn the degree of importance and the degree of correlation between each of the one or more data sources and a corresponding one of the plurality of applications using a machine learning model.

The ranking component 436 may assign weighted values to the degree of importance and the degree of correlation for each of the one or more data sources. The ranking component 436, in association with the machine learning component 438, may also assign a confidence score according to a scoring model for each of the plurality of applications. Each confidence score may be used for ranking each one of the plurality of applications.

The decommission component 439 may retain or remove/decommission each of the plurality of applications according to the ranking. That is, the decommission component 439 may decommission one or more applications having a ranking/confidence score below (or above depending on user preferences) a predetermined threshold, below a weighted value, and/or outside of a range of values that indicated applications required for being retained.

The intelligent application management system 430 may include the post-processing analytics component 450 ("analytics component") that may be used to provide one or more recommendations or suggestions (via the UI component) to follow relating to the ranking and decommissioning operations. The post-processing analytics component 450 may also provide one or more alternative suggestions relating to decisions for software application retention and/or decommissioning.

The intelligent application management system 430 may also include and initiate the machine learning component 438 to: 1) train a scoring model based on one or more defined scoring rules and parameters for a, wherein the scoring model is a probabilistic model, and/or 2) collect feedback data relating to the scoring model, and/or 3) adjust the scoring rules and parameters according to the collected feedback data.

The machine learning component 438 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

In one aspect, the intelligent application management system 430 may perform one or more various types of calculations or computations. The calculation or computation operations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.). It should be noted that each of the components of the intelligent application management system 430 may be individual components and/or separate components of the intelligent application management system 430.

Figure 5A:
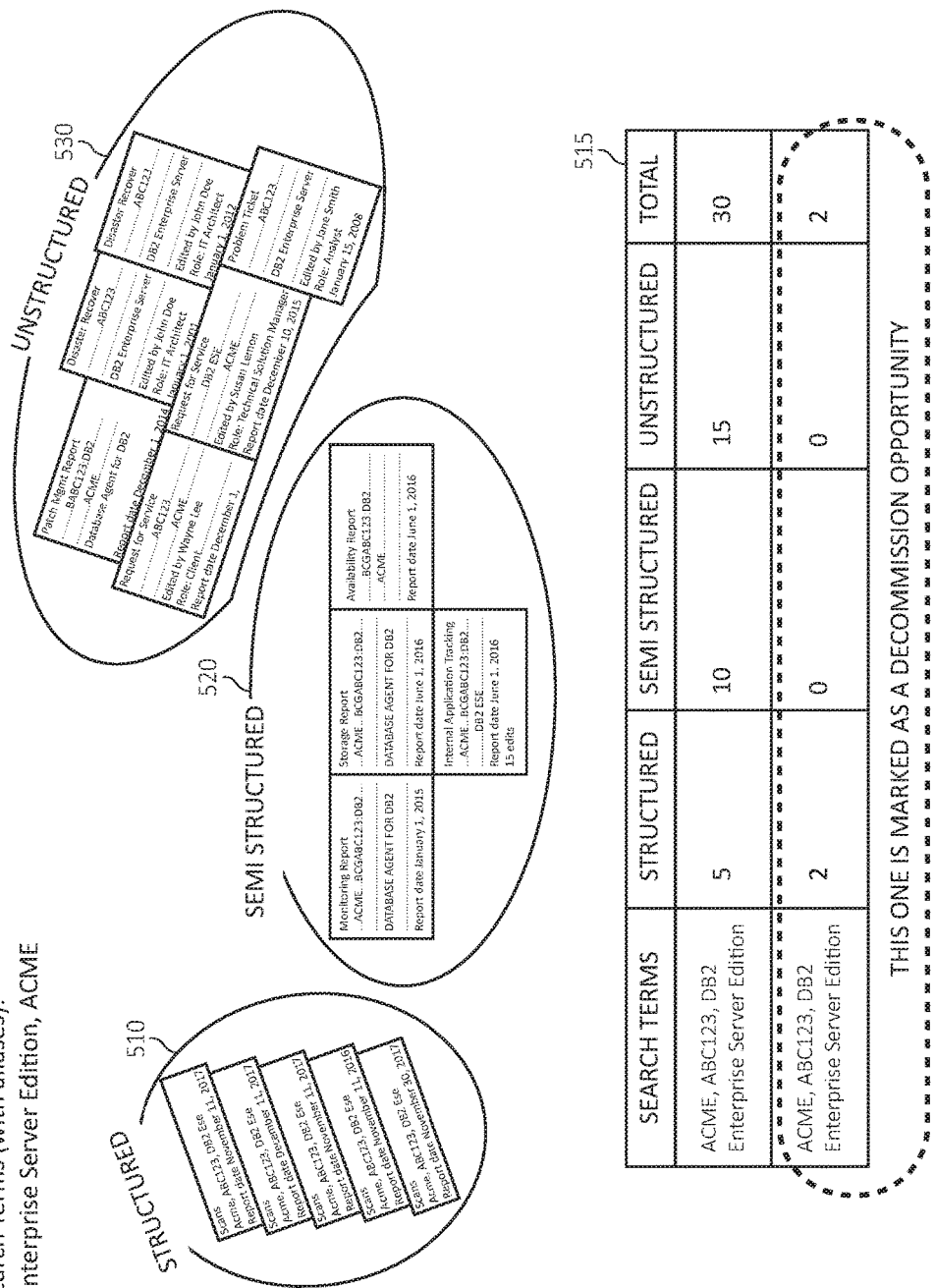

Turning now to FIG. 5A-B, a block diagram of exemplary functionality 500 and 525 relating to intelligent application management is depicted. As shown, the various blocks of functionality are depicted with arrows designating the blocks' 500 and 525 relationships with each other and to show process flow. As shown, the various functionality, or "modules" of functionality, hardware devices, and/or other components in the same descriptive sense as has been previously described in FIGS. 1-4 may be included in FIGS. 5A-5B. Additionally, descriptive information is also seen relating each of the functional blocks 500 and 525. As will be seen, many of the functional blocks may also be considered "modules" of functionality, in the same descriptive sense as has been previously described in FIGS. 1-4. With the foregoing in mind, the module blocks 500 and 525 may also be incorporated into various hardware and software components of a system for extraction and summarization of decisions in accordance with the present invention, such as those described in FIGS. 1-4. Many of the functional blocks 500 may execute as background processes on various components, either in distributed computing components, or on the user device, or elsewhere.

As a preliminary matter, the present invention such as, for example, the intelligent application management system 430 of FIG. 4, enables searching one or more related databases and may identify and rank related data files/records regarding a degree of relatedness and data files/records importance in relation to software applications. That is, the intelligent application management system 430 of FIG. 4, may connect those software components having a degree of relatedness and/or degree of importance to many various and different data sources (e.g., internal and/or external data sources) such as, for example, computer system backups, computer system scanning, computer system monitoring, availability, patch management and problem management, and the like. Those software components may each be ranked according to the degree of relatedness and/or degree of importance. Those software components having a ranking less than a defined threshold or percentage may be tagged, returned, marked, and/or identified as potential software decommission candidates.

As illustrated in FIGS. 5A-5B, consider now the various operations involving intelligent application management system 430 of FIG. 4. First, a query may be submitted or provided to determine and identify potential software decommission candidates such as, for example, "Can we decommission Db2 enterprise server edition on Hostname: ABC123 for account ACME?" The key search terms (with aliases) may include "DB2 Enterprise Server Edition" and "ACME."

The intelligent application management system 430 of FIG. 4 may identify, search, and/or analyze one or more data sources such as, for example, data sources 510, 520, and 530. In one aspect, data source 510 may be and/or include structured data, data source 520 may be and/or include unstructured data, and data source 530 may be and/or include semi-structured data.

The intelligent application management system 430 of FIG. 4 may perform a searching operation (e.g., similar to a search engine to peruse the data sources 510, 520, and 530 for potential matches and receive a score for those data sources having a degree of relatedness and/or degree of importance. Each of the data sources 510, 520, and 530 may have and use the degree of relatedness and/or the degree of importance for ranking and be used for assigning a weighted value for the ranking operation. The higher the degree of relatedness or degree of importance assigned to each of the data sources 510, 520, and 530 based on the relationship to a data file, record, or software component, the higher the ranking may be for each of the data sources 510, 520, and 530. For example, the greater or increased number of times a data source is used, referenced, modified, adjusted, updated and/or labeled as important or relevant in relation to the software application, the ranking operation may assign a higher weighted value and/or confidence score to increase the ranking.

In one aspect, the recency of the data file, record, or software component would also impact the ranking as would the number of edits of the data file, record, or software component. For example, the more recent in time the data file, record, or software component is in relation to the software application, the greater the weighted value (e.g., higher value) may be assigned for the ranking may be assigned. Also, an increased number of times of edits to the data file, record, or software component, the greater the weighted value (e.g., higher value) may be assigned for the ranking may be assigned. Also, the quality of software identification may also contribute to the ranking. Other factors that may be used to increase and/or decrease the weighted value/confidence score for ranking the data sources 510, 520, and 530 to indicate either retaining the software application and/or decommissioning the software may include, for example, a status of a user editing the records (e.g., an administrator or end user making edits), the user's role and relative importance (band or job title) as it relates to an entity (e.g., company such as, for example, a manager) or relates to the software application itself (e.g., an end user or software administrator). After the ranking and classification, those of the data sources 510, 520, and 530 having lower ranked software component scores as compared to those with a higher ranked software component scores may be identified as potential software decommission candidates.

For example, the intelligent application management system 430 of FIG. 4 may provide a query result 515 of a probabilistic model from a query "Can we decommission Db2 enterprise server edition on Hostname: ABC123 for account ACME?" for a software application. The key search terms (with aliases) may include "DB2 Enterprise Server Edition" and "ACME" and yield the query result 515. Query result 515 may be a table that identifies in the columns the search terms and the number of times each type of data (e.g., structured, semi-structured, and/or unstructured data) is references along with a combined total. For example, row 1 identifies the software application (DB2 enterprise server edition) as a non-potential software decommission candidate from the query with the search terms of ACME, ABC123, and DB2 enterprise server edition. The search result identified 5 structured data files/records, 10 semi-structured files/records, and 15 unstructured data files/records with only a total ranking score of 30.

In contrast, row 2 identifies the software application (DB2 enterprise server edition) as a potential software decommission candidate based on the query with the search terms of ACME, host: DEF123, and DB2 enterprise server edition. The search result identified only 2 structured data files/records, 0 semi-structured files/records, and 0 unstructured data files/records with only a total ranking score of 2. In one aspect, the ranking assigned a weighted value of "1" for each identified data source and added the each of the weighed values to yield a total ranking score. Other scoring methods and assigned values may be used according to user preference.

In one aspect, the scoring operation for the intelligent application management system 430 of FIG. 4 may form the basis of a probabilistic calculation. The scoring model may initially provide a rules-based approach based user preferences or learned via a machine learning operation. The output of this scoring model may be extended into the creation of a trained probabilistic model with a feedback component for the purpose of reinforced weighting (e.g., machine learning). In one aspect, the initial scoring model for ranking each of the software applications according to a degree of importance, a degree of correlation, or a combination thereof in relation to the one or more the data sources 510, 520, and 530 to indicate either retaining the software application and/or decommissioning the software may be designed, developed, or started with following features, as illustrate in the follow format:

1) Account Name Vocabulary: $V=\{w1, w2, \ldots, wn\}$
2) Hostname Vocabulary: $V=\{x1, x2, \ldots, xn\}$
3) Component Vocabulary: $V=\{y1, y2, \ldots, yn\}$
4) Query: $q=q1, \ldots, qm$ where $qi\{V\}$
5) Document: $di=di1, \ldots, dimj$ where $dij \{V\}$
6) Document Type: $V=\{z1, z2, \ldots, zn\}$
6) Collection: $C=\{d1, \ldots dm\}$; and
7) Set of relevant documents: $R(q)\{C\}$ In one aspect, the intelligent application management system 430 of FIG. 4 may compute/determine an aggregate number of an amount of relevant data files (e.g., documents), records, or software components in relation to the software application and assign a confidence score (e.g., weighted values) for ranking the software applications as potential candidates for decommission. Those of the software applications that having a lower total ranking/score (e.g., with limited or no relevant data files (e.g., documents), records, or software components) compared with those of the software applications that having a higher total ranking/score may be identified as potential decommissioning opportunities (e.g., software application decommission candidate).

In achieving the results of the query result 515, the probabilistic model of a machine learning operation of the intelligent application management system 430 of FIG. 4, the probabilistic model may process, determine, calculate, and/or generate a confidence score (e.g., a question of combined weights and activations) and may also generate results table 535, 545, and 555. For example, table 535 may include, for example, document type, document type importance, currency importance, and hostname required in a search. Table 545 may include, for example, author title type and author importance. Table 555 may include, for example, an a current ("cur") type and author importance aggregate for ranking the software applications as potential candidates for decommission. The intelligent application management system 430 of FIG. 4 may assign a ranking according to the degree importance and degree of relevance (e.g., both a software application installed and used) of the software components associated with a selected software application.

Figure 6:
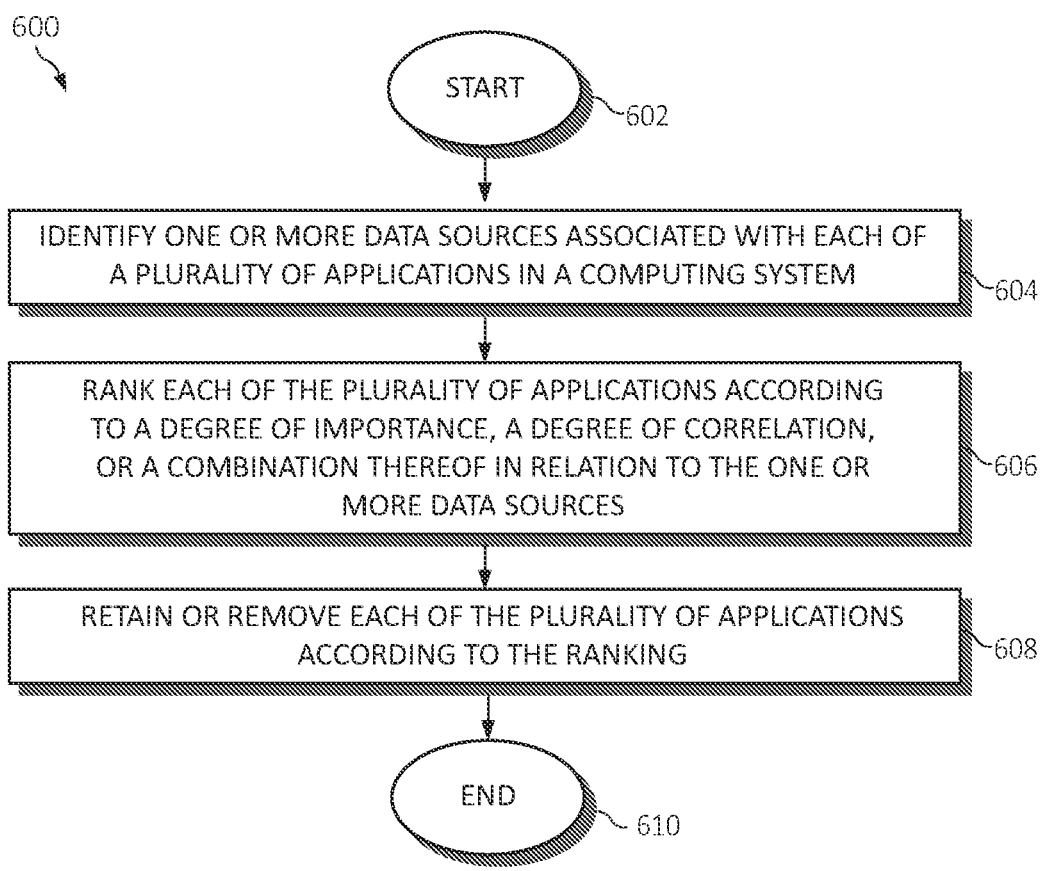
FIG. 6 is a flowchart diagram depicting an exemplary method for providing intelligent application management by a processor; again, in which aspects of the present invention may be realized.

Turning now to FIG. 6, a method 600 for providing intelligent application management is depicted, in which various aspects of the illustrated embodiments may be implemented. The functionality 600 may be implemented as a method executed as instructions on a machine, where the instructions are included on at least one computer readable medium or on a non-transitory machine-readable storage medium. The functionality 600 may start in block 602.

One or more data sources associated with each of a plurality of applications may be identified in a computing system, as in block 604. Each of the plurality of applications may be ranked according to a degree of importance, a degree of correlation, or a combination thereof in relation to the one or more data sources, as in block 606. Each of the plurality of applications may be retained or removed according to the ranking, as in block 608. The functionality 600 may end in block 608.

In one aspect, in conjunction with and/or as part of at least one block of FIG. 6, the operation of 600 may include each of the following. The operation of functionality 600 may define the one or more data sources to include structured data, semi-structured data, and non-structured data in the computing system, wherein the one or more data sources is associated with one or more of the plurality of applications. The operation of functionality 600 may perform a natural language processing (NLP) on the one or more data sources for determining the degree of importance and the degree of correlation. The operation of functionality 600 may learn the degree of importance and the degree of correlation between each of the one or more data sources and a corresponding one of the plurality of applications using a machine learning model.

The operation of functionality 600 may assign weighted values to the degree of importance and the degree of correlation for each of the one or more data sources, and/or assign a confidence score according to a scoring model for each of the plurality of applications, wherein each confidence score is used for ranking each one of the plurality of applications.

The operation of functionality 600 may initiate a machine learning operation to train a scoring model based on one or more defined scoring rules and parameters for a, wherein the scoring model is a probabilistic model; collect feedback data relating to the scoring model; or adjust the scoring rules and parameters according to the collected feedback data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for providing intelligent application management, comprising:
    receiving a query to identify application decommission candidates from a plurality of applications, each comprising executable programs installed onto a computing system, to remove from the computing system, wherein the application decommission candidates are those of the plurality of applications being stale and unused or previously uninstalled from the computing system notwithstanding signature traces remain on the computing system;
    identifying one or more data sources associated with each of the plurality of applications, wherein the one or more data sources contain data produced by the plurality of applications;
    ranking each of the plurality of applications according to a degree of importance, a degree of correlation, or a combination thereof in relation to the one or more data sources, wherein the ranking identifies the application decommission candidates based on at least a recency of changes to the data produced by each of the plurality of applications and retained in the one or more data sources; and
    retaining or removing each of the plurality of applications on the computing system according to the identified application decommission candidates based on the ranking, wherein the retaining includes maintaining those of the executable programs to be retained as actively installed on the computing system and the removing includes decommissioning or uninstalling those of the executable programs to be removed from the computing system.

2. The method of claim 1, further including defining the one or more data sources to include structured data, semi-structured data, and non-structured data in the computing system, wherein the one or more data sources is associated with one or more of the plurality of applications.

3. The method of claim 1, further including performing a natural language processing (NLP) on the one or more data sources for determining the degree of importance and the degree of correlation.

4. The method of claim 1, further including learning the degree of importance and the degree of correlation between each of the one or more data sources and a corresponding one of the plurality of applications using a machine learning model.

5. The method of claim 1, further including assigning weighted values to the degree of importance and the degree of correlation for each of the one or more data sources.

6. The method of claim 1, further including assigning a confidence score according to a scoring model for each of the plurality of applications, wherein each confidence score is used for ranking each one of the plurality of applications.

7. The method of claim 1, further including initiating a machine learning operation to:

train a scoring model based on one or more defined scoring rules and parameters, wherein the scoring model is a probabilistic model;
collect feedback data relating to the scoring model; or
adjust the scoring rules and parameters according to the collected feedback data.

8. A system for providing intelligent application management, comprising:
    one or more computers with executable instructions that when executed cause the system to:
        receive a query to identify application decommission candidates from a plurality of applications, each comprising executable programs installed onto a computing system, to remove from the computing system, wherein the application decommission candidates are those of the plurality of applications being stale and unused or previously uninstalled from the computing system notwithstanding signature traces remain on the computing system;
        identify one or more data sources associated with each of the plurality of applications, wherein the one or more data sources contain data produced by the plurality of applications;
        rank each of the plurality of applications according to a degree of importance, a degree of correlation, or a combination thereof in relation to the one or more data sources, wherein the ranking identifies the application decommission candidates based on at least a recency of changes to the data produced by each of the plurality of applications and retained in the one or more data sources; and
        retain or remove each of the plurality of applications on the computing system according to the identified application decommission candidates based on the ranking, wherein the retaining includes maintaining those of the executable programs to be retained as actively installed on the computing system and the removing includes decommissioning or uninstalling those of the executable programs to be removed from the computing system.

9. The system of claim 8, wherein the executable instructions define the one or more data sources to include structured data, semi-structured data, and non-structured data in the computing system, wherein the one or more data sources is associated with one or more of the plurality of applications.

10. The system of claim 8, wherein the executable instructions perform a natural language processing (NLP) on the one or more data sources for determining the degree of importance and the degree of correlation.

11. The system of claim 8, wherein the executable instructions learn the degree of importance and the degree of correlation between each of the one or more data sources and a corresponding one of the plurality of applications using a machine learning model.

12. The system of claim 8, wherein the executable instructions assign weighted values to the degree of importance and the degree of correlation for each of the one or more data sources.

13. The system of claim 8, wherein the executable instructions assign a confidence score according to a scoring model for each of the plurality of applications, wherein each confidence score is used for ranking each one of the plurality of applications.

14. The system of claim 8, wherein the executable instructions initiate a machine learning operation to:

train a scoring model based on one or more defined scoring rules and parameters, wherein the scoring model is a probabilistic model;

collect feedback data relating to the scoring model; or adjust the scoring rules and parameters according to the collected feedback data.

15. A computer program product for providing intelligent application management by a processor, the computer program product comprising a non-transitory computer-readable storage medium having computer-readable program code portions stored therein, the computer-readable program code portions comprising:

an executable portion that receives a query to identify application decommission candidates from a plurality of applications, each comprising executable programs installed onto a computing system, to remove from the computing system, wherein the application decommission candidates are those of the plurality of applications being stale and unused or previously uninstalled from the computing system notwithstanding signature traces remain on the computing system;

an executable portion that identifies one or more data sources associated with each of the plurality of applications, wherein the one or more data sources contain data produced by the plurality of applications;

an executable portion that ranks each of the plurality of applications according to a degree of importance, a degree of correlation, or a combination thereof in relation to the one or more data sources, wherein the ranking identifies the application decommission candidates based on at least a recency of changes to the data produced by each of the plurality of applications and retained in the one or more data sources; and an executable portion that retains or removes each of the plurality of applications on the computing system according to the identified application decommission candidates based on the ranking, wherein the retaining includes maintaining those of the executable programs to be retained as actively installed on the computing system and the removing includes decommissioning or uninstalling those of the executable programs to be removed from the computing system.

16. The computer program product of claim 15, further including an executable portion that defines the one or more data sources to include structured data, semi-structured data, and non-structured data in the computing system, wherein the one or more data sources is associated with one or more of the plurality of applications.

17. The computer program product of claim 15, further including an executable portion that performs a natural language processing (NLP) on the one or more data sources for determining the degree of importance and the degree of correlation.

18. The computer program product of claim 15, further including an executable portion that learns the degree of importance and the degree of correlation between each of the one or more data sources and a corresponding one of the plurality of applications using a machine learning model.

19. The computer program product of claim 15, further including an executable portion that:

assigns weighted values to the degree of importance and the degree of correlation for each of the one or more data sources; and assigns a confidence score according to a scoring model for each of the plurality of applications, wherein each confidence score is used for ranking each one of the plurality of applications.

20. The computer program product of claim 15, further including an executable portion that initiates a machine learning operation to:

train a scoring model based on one or more defined scoring rules and parameters, wherein the scoring model is a probabilistic model;

collect feedback data relating to the scoring model; or adjust the scoring rules and parameters according to the collected feedback data.

\* \* \* \* \*